US005452051A

United States Patent [19]

Hicks

[11] Patent Number: 5,452,051

[45] Date of Patent: Sep. 19, 1995

[54] FILM TABBING APPARATUS

[76] Inventor: Ray Hicks, 2605 Corunna Rd., Flint, Mich. 48503

[21] Appl. No.: 67,474

[22] Filed: May 25, 1993

[51] Int. Cl.[6] .......................... G03B 27/52; G03B 27/58

[52] U.S. Cl. .......................................... 355/40; 355/41; 355/71; 355/74

[58] Field of Search ...................... 355/40, 41, 77, 38, 355/68, 71, 74; 354/297, 298; 156/502, 506

[56] References Cited

U.S. PATENT DOCUMENTS

| | | | |
|---|---|---|---|
| 4,039,258 | 8/1977 | Hujer et al. | 355/38 X |
| 4,294,537 | 10/1981 | Laskey et al. | 355/40 X |
| 4,482,924 | 11/1984 | Brownstein | 355/40 X |
| 4,645,334 | 2/1987 | Shimada | 355/40 |
| 4,931,829 | 6/1990 | Hakamada | 355/74 X |
| 4,951,086 | 8/1990 | Hicks | 355/41 |
| 5,023,655 | 6/1991 | Hicks | 355/39 |
| 5,072,256 | 12/1991 | Hicks | 355/71 |
| 5,093,682 | 3/1992 | Hicks | 355/1 |
| 5,097,292 | 3/1992 | Hicks | 355/75 |

*Primary Examiner*—D. Rutledge

*Attorney, Agent, or Firm*—Young, MacFarlane & Wood

[57] ABSTRACT

A film tabbing apparatus and methodology for processing supply of photographic film including single frame chips and multiple frame strips. The chips and strips are moved along a linear feed path in a single file through the apparatus, a tabbing tape is moved along the linear feed path with the longitudinal edge of the tape positioned approximate an adjacent longitudinal edge of the film file, the proximate longitudinal edges of the tape and the film file are secured together utilizing adhesive tape, and a coded indicium is provided on the tape corresponding to each frame of the film file. The adhesive tape may be applied in an overlying relation to the seam between the film file and the paper tabbing tape, in an underlying relation to the seam, or tapes may be applied simultaneously in an overlying and an underlying relation to the seam. A human readable indicium is also provided on the tape corresponding to each frame of the film file. A cropping station is provided along the feed path and the film file is moved laterally and longitudinally at the cropping station to facilitate the cropping of the film frame positioned at the cropping station.

11 Claims, 5 Drawing Sheets

FIG-3
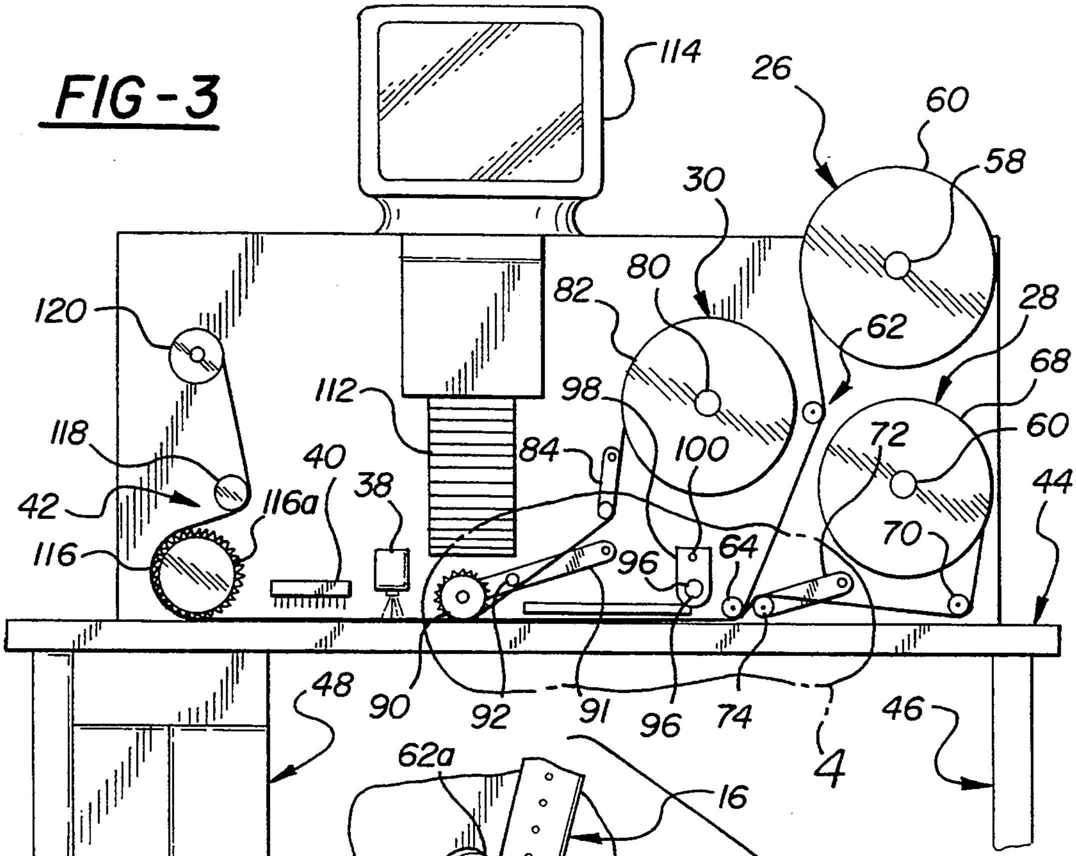
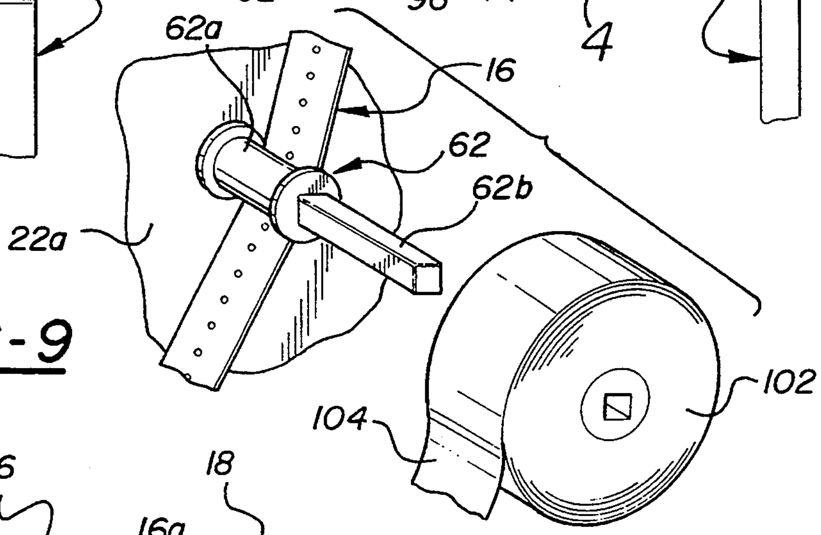
FIG-9
FIG-10
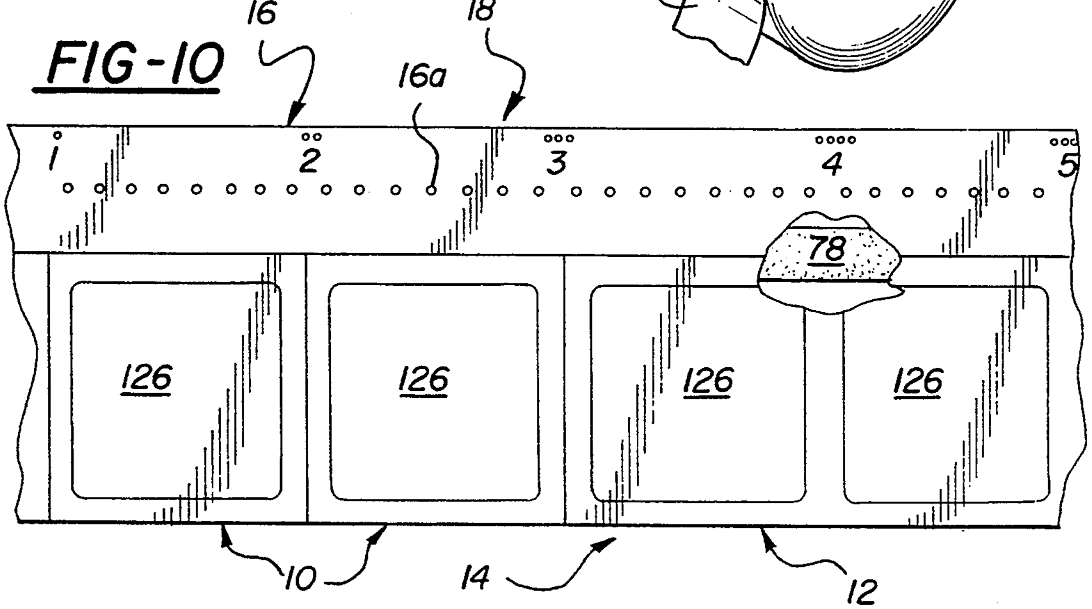

FILM TABBING APPARATUS

FIELD OF THE INVENTION

This invention relates to a film tabbing apparatus.

Whereas the handling of film on a continuous roll is relatively simple in the sense that the film may be fed continuously through the film processing apparatus by known film drive mechanisms, the handling of single frame pieces of film, called chips, and multiple frame pieces of film, called strips, is more difficult by virtue of a lack of continuity of film material to be processed.

In an effort to simplify the handling of film chips and film strips, tabbing apparatuses have been developed in which the chips and strips are moved along a linear feed path in a single file and a paper tape is applied to one longitudinal edge of the film file so that the chips and strips may be handled as a single continuous item. These prior art tabbing apparatuses also typically provide some information on the paper tape with respect to, for example, a start point, a stop point, or a print/no print decision with respect to any given frame. However the prior art tabbing apparatuses do not provide coding on the tape for each frame of the film file so that if exposure or printing information is to be correlated with prints the data must be correlated in a synchronous fashion. For example, a data base may know that a color correction is required for the second frame on a continuous tabbed collection of chips and strips. However, this sequential correlation of data with exposures is fraught with difficulty. The most serious problem is an out of sequence error. If the photographic printer skips or inadvertently reprints a single frame, each subsequent frame is also misprinted inasmuch as the correlative data related to that exposure is one frame off.

SUMMARY OF THE INVENTION

This invention is directed to the provision of an improved film tabbing apparatus.

This invention is more specifically directed to the provision of an improved tabbing method and apparatus in which each frame of the film file is individually coded.

The invention relates to a method of processing a supply of photographic film including single frame chips and multiple frame strips. According to the invention, the chips and strips are moved along a linear feed path in a single file; a tabbing tape is moved along the linear feed path with the longitudinal edge of the tape positioned proximate an adjacent longitudinal edge of the film file; the proximate longitudinal edges of the tape and the film file are secured together; and a coded indicium is provided on the tape corresponding to each frame of the film file. This methodology individually identifies each frame of the film file and allows the stored data base information for each frame of the film file to be individually accessed.

According to a further feature of the invention methodology the methodology includes the further step of providing a human readable indicium on the tape corresponding to each frame of the film file. This arrangement allows the operator to visually individually identify each frame on the film file to facilitate processing of each frame in the film file.

According to a further feature of the invention methodology the method includes the further steps of providing a cropping station along the feed path and moving the film file laterally of the feed path at the cropping station. This methodology facilitates the cropping of the film frame positioned at the cropping station.

The invention tabbing apparatus includes means defining a feed surface; guide means defining a feed path along the feed surface for receipt of a single file of single frame chips and multiple frame strips; means for delivering a tabbing tape along the feed path and positioning the tape along one longitudinal edge of the film file to form a seam between the film file and the tape; and means for delivering a supply of adhesive tape to the feed path in overlapping relation to the seam and having a first configuration in which the adhesive tape is delivered to the feed path in overlying relation to the seam and a second configuration in which the adhesive tape is delivered to the feed path in underlying relation to the seam. This arrangement allows the adhesive tape to be applied in overlying or underlying relation to the seam between the film file and the tape depending upon the requirements of each particular application.

According to a further feature of the invention tabbing apparatus, the adhesive tape delivery means has a third configuration in which a first strip of adhesive tape is delivered to the feed path in overlying relation to the seam and a second strip of adhesive tape is simultaneously delivered to the feed path in underlying relation to the seam. This arrangement allows tape to be applied both over and under the seam in situations in which such double securement is desired or required.

According to a further feature of the invention tabbing apparatus, the apparatus further includes means operative to provide a machine readable coded indicium on the tabbing tape corresponding to each frame of the film file. This arrangement enables each frame to be individually accessed so that any piece of subsequent processing equipment may readily call up the stored data base information relating to each frame of the film file.

According to a further feature of the invention film tabbing apparatus, the apparatus further includes a cropping station and means operative to move the film file laterally of the feed path at the cropping station. This arrangement allows the film to undergo a cropping process as it is moved along the feed path.

According to a further feature of the invention film tabbing apparatus, the apparatus further includes means operative to provide a human readable indicium on the tape corresponding to each frame of the film file. This arrangement allows the operator to individually visually identify each frame for processing purposes.

In the disclosed embodiment of the invention, the machine readable indicium providing means comprises a punch positioned along the feed path and operative to punch a coded indicium in the tape corresponding to each frame of the film file; the human readable indicium providing means comprises an ink jet positioned along the feed path and operative to spray a human readable indicium on the tape corresponding to each frame of the film path; a seam is formed between the tape and the longitudinal edge of the film file; and the means operative to secure the tape to the film file comprises means for delivering a supply of adhesive tape to the feed path in overlapping relation to the seam.

The invention also discloses a unique composite article of photographic film comprising a plurality of single frame chips and a plurality of multiple frame strips arranged in a single file; a tabbing tape secured to one longitudinal edge of the file; and a coded indicium on the tape corresponding to each frame of the film file. The coded indicium may be machine readable and the article may further include a human readable indicium on the tape corresponding to each frame of the film file.

BRIEF DESCRIPTION OF THE DRAWINGS

FIG. 3 is a front elevational view of the invention tabbing apparatus;

FIGS. 7, 8 and 9 are fragmentary detail views of portions of the invention tabbing apparatus; and FIG. 10 is a fragmentary plan view of a composite article of photographic film produced by the invention film tabbing apparatus.

DETAILED DESCRIPTION OF THE PREFERRED EMBODIMENT

Figure 1:
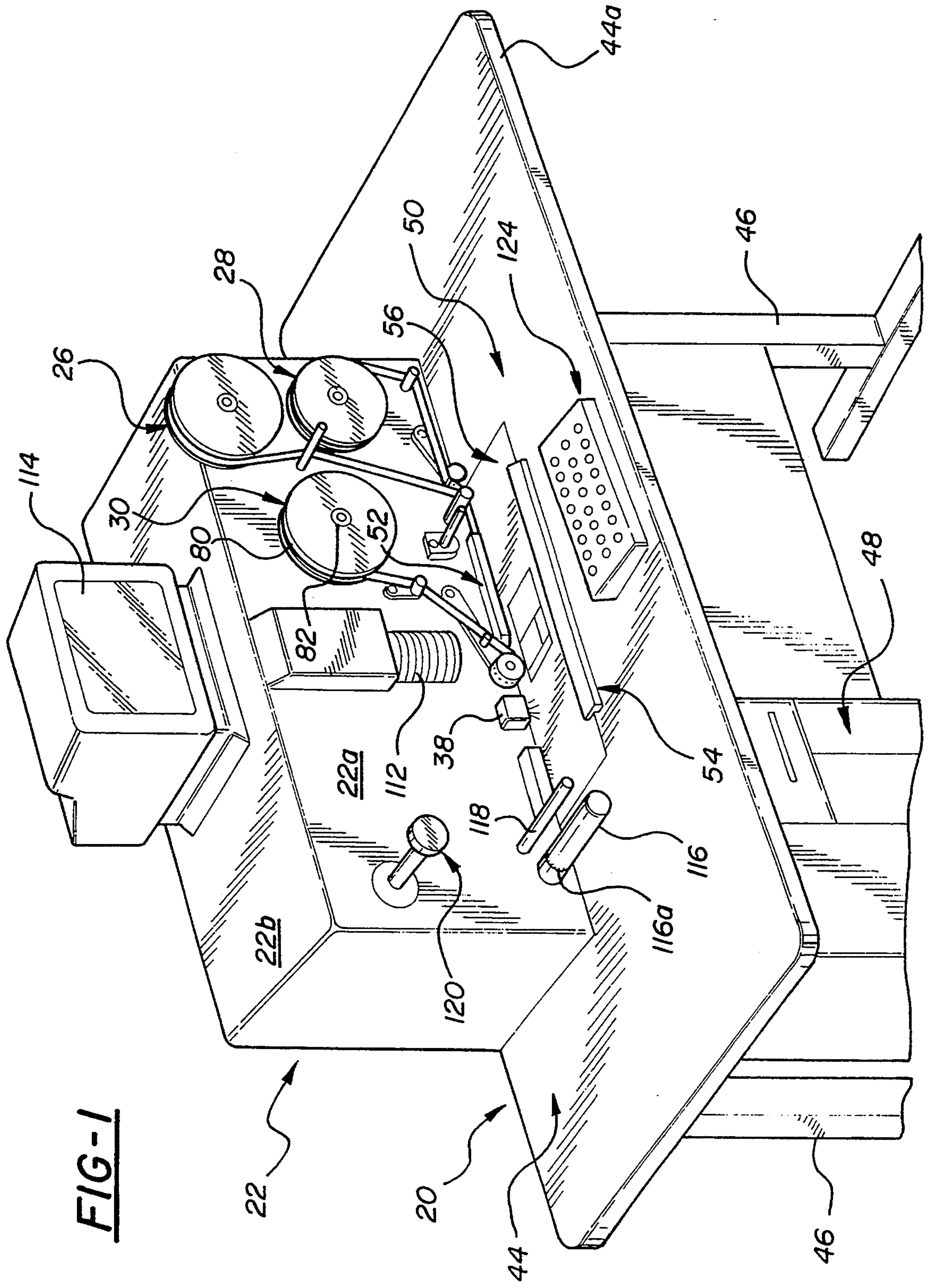
FIG. 1 is a perspective view of a tabbing apparatus according to the invention.
Figure 2:
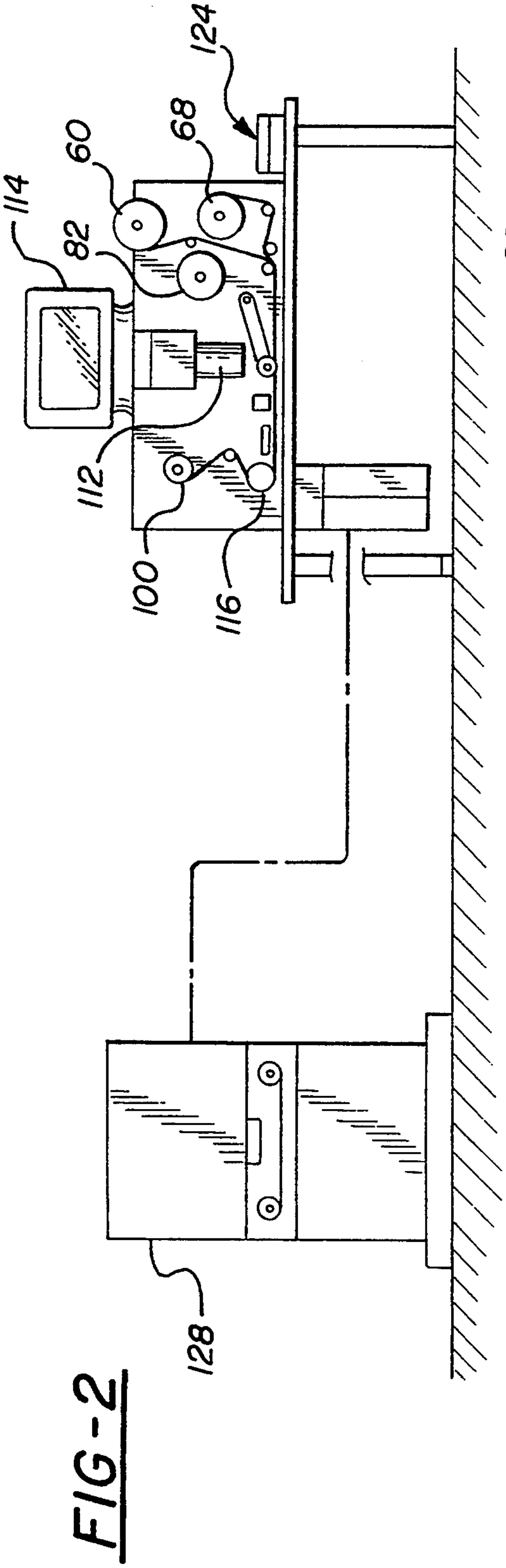
FIG. 2 is a somewhat schematic view showing the invention tabbing apparatus in association with subsequent film processing equipment.

The invention tabbing apparatus is arranged to process a supply of photographic film including single frame chips 10 and multiple frame strips 12. The chips 10 and strips 12 are arranged in a linear single file 14 and moved along a linear feed path, a tabbing tape 16 is moved along the linear feed path with a longitudinal edge of the tape positioned proximate an adjacent longitudinal edge of the film file 14, and the proximate longitudinal edges of the tape 16 and film file 14 are secured together to form a composite article of photographic film 18 including the single frame chips 10, the strips 12, and the paper tape 16 secured to the chips and strips. Paper tape 16 includes a row at holes or perforations 16*a* to facilitate movement of the paper tape, and thereby of the attached chips and strips, through the tabbing apparatus.

The tabbing apparatus includes a table 20, a housing 22, film guide means 24, paper tape delivery means 26, underlying adhesive tape delivery means 28, overlying adhesive tape delivery means 30, roll film delivery means 32, a cropping assembly 36, an ink jet 38, a punch 40, and a take-up and drive assembly 42.

Table 20 includes a table top 44 supported on legs 46 and including a data base storage housing 48 positioned beneath table top 44. Housing 22 has a generally rectangular prismatic configuration and is supported on top of table top 44 with the front face 22*a* of the housing spaced rearwardly from the front edge 44*a* of table top 44 to define an apron surface 50 defined by the table top 44 forwardly of the housing.

Film guide means 44 includes an inboard guide rail 52 positioned proximate the front face 22*a* of housing 22, an outboard guide rail 54 positioned on apron surface 50 outboard of rail 52, and a base guide plate 56 recessed in apron surface 50 and extending generally between guide rails 52 and 54. Rails 52 and 54 have an inverted L configuration in cross section so as to define opposed grooves 52*a*, 54*a* and vertical edges 52*b*, 54*b* which are spaced apart by an amount slightly in excess of the width of the composite article 18. Guides 52 and 54 will be seen to coact with the upper face 56*a* of base plate 56 to define an X axis feed path 57 for the composite article 18 extending in a linear manner along plate 56 in front of housing 20 so that the composite article 18, comprising a plurality of chips 10 and a plurality of strips 14 arranged in a single file, may be moved along the linear feed path defined by the guide rails.

Paper tape delivery means 26 includes a spool 58 mounted on the front face 22*a* of housing 22 and supporting a roll 60 of paper tape 16; a spool 62 mounted on the forward face 22*a* of housing 20 beneath and forwardly of spool 58 and including a paper tape spool guide portion 62*a* and a roll film shaft 62*b*; and a roller 64 mounted on the front face 22*a* of the housing below and forwardly of spool 62 in proximity to the upper face 56*a* of guide plate 56 and rearwardly of the rearward end 52*c* of guide rail 52. Spool 58, spool 62 and roller 64 will be seen to coact to deliver paper tape 16 from roll 60 to the vicinity of the upper face 56*a* of base plate 56 rearwardly of the rearward end 52*c* of guide rail 52.

Underlying adhesive tape delivery means 28 includes a spool 66 on the front face 22*a* of the housing supporting a roll 68 of adhesive tape, a guide roller 70 positioned rearwardly and below spool 66, and a spring biased lever arm 72 pivoted at 73 on the front face 22*a* of the housing and mounting a roller 74 at its forward end 72*a*. Lever 72 is spring biased by means (not shown) to urge the roller 74 in the direction of the arrow 76 in FIG. 4. Spool 66 and rollers 70 and 74 will be seen to coact to deliver adhesive tape 78 from roll 68 to a location proximate the upper face 56*a* of guide block 56 and in underlying relation to paper tape 16 arriving at the roller 64.

Figure 4:
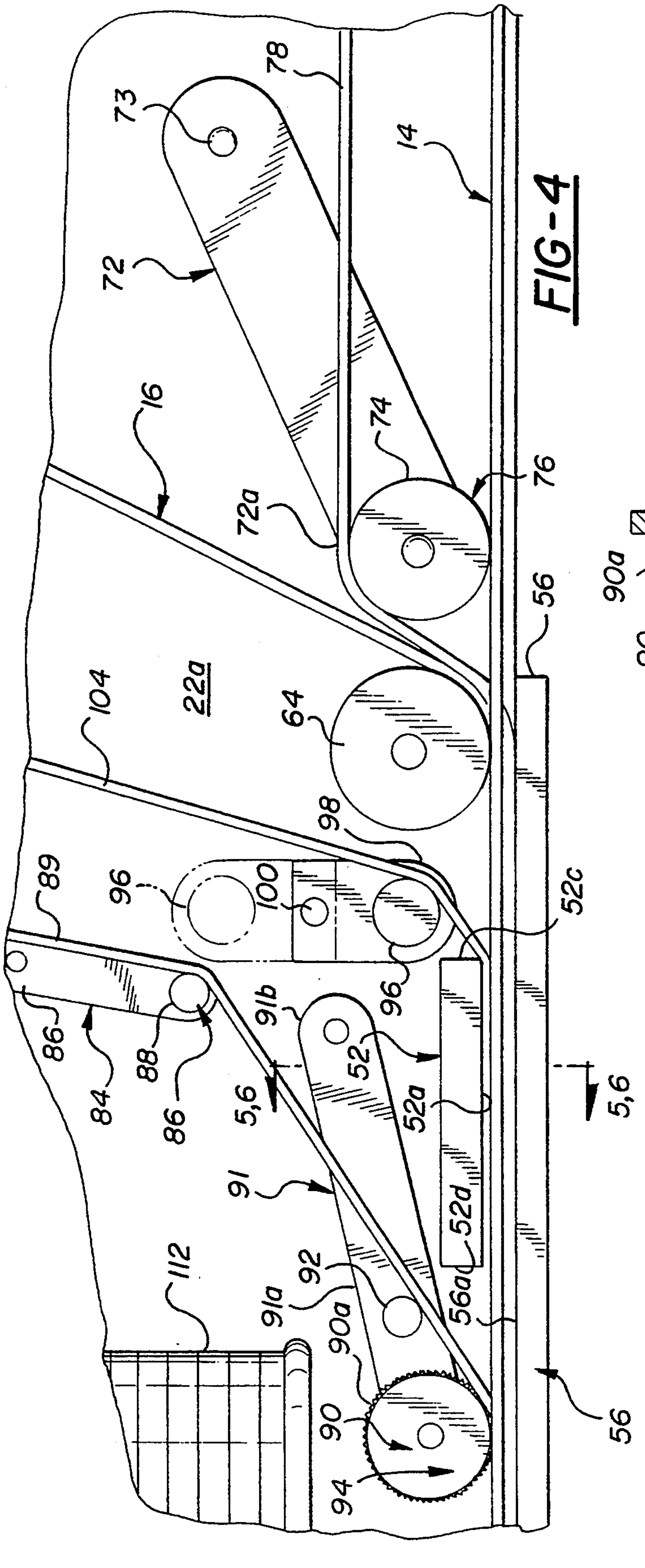
FIG. 4 is a detail view taken within the circle 4 of FIG. 3.

Overlying adhesive tape delivery means 30 includes a spool 80 on the front face 22*a* of the housing mounting a roll of adhesive tape 82; a lever 84 pivotally mounted at its upper end 84*a* on the front housing face 22*a* and including spring means (not shown) urging the lever for pivotal movement in the direction of the arrow 86 in FIG. 4 so as to urge a guide rod 88 carried by the lower end of the lever against adhesive tape 88 from spool 82; and a guide roller 90 carried on the forward end 91*a* of a lever 91 pivotally mounted at its rearward end 91*b* on the front housing face 22*a*. A guide rod 92 is positioned on lever 91 rearwardly of roller 90 and means (not shown) are provided to spring bias the lever 91 to urge the roller 90 in the direction of the arrow 94 in FIG. 4 and thereby urge the roller 94 downwardly against the upper face of guide plate 56. Spool 80, guide rod 88, guide rod 92 and roller 90 will be seen to coact to deliver adhesive tape 89 from roll 82 to a location proximate the upper face 56*a* of guide block 56 immediately forwardly of the front end 52*d* of guide rail 52. Guide roller 90 includes circumferentially spaced teeth or serrations for coaction with holes or perforations 16*a* in tabbing tape 16.

Roll film delivery means 32 includes the rod portion 62*b* of spool 62, and a guide rod 96 provided on one end of a lever 98 pivotably mounted at 100 to the front housing face 22*a* and movable between an upstanding inoperative position seen in dotted lines in FIG. 4, wherein guide rod 96 is spaced above the upper face 56*a* of the guide plate 56, and a downstanding operative position, seen in solid lines in FIG. 4, in which the guide rod 96 is positioned in overlying proximate relation to the upper face 56*a* of guide plate 56 immediately rearwardly of the rear end 52*c* of guide rail 52.

It will be seen that, with a roll of film 102 positioned on rod 62*b*, the film 104 from roll 102 is delivered via guide rod 96 to a location proximate the upper face 56*a* of the guide plate 56 immediately rearwardly of the rear end 52c of guide rail 52.

Cropping assembly 36 includes a cropping plate 108, a stepper motor 110, a camera 112, and a display screen 114. Cropping plate 108 is mounted for transverse or Y axis movement in a transverse groove 56b defined on the upper face 56a of guide plate 56 and includes a template 116 inscribed on the upper face 108a of the cropping plate.

Stepper motor 110 is positioned beneath table top 44 and includes an axially movable output shaft 110a extending beneath guide plate 56 and including a pair of pins 110d upstanding from shaft 110a and passing through a slot 56c in guide block 56 for receipt in a pair of holes 108b in cropping plate 108 so that stepping movement of motor 110 moves motor shaft 110a in stepping fashion in the Y axis direction to thereby move cropping plate 108 in a Y axis direction with the sliding movement of the cropping plate being guided by the groove 56b of guide plate 56.

Camera 112 is of known form and is positioned in overlying relation to template 115 on cropping plate 108 with the centerline of the camera generally coincident with the centerline of the X and Y axes of template 115.

Display screen 114 is positioned on the top face 22b of housing 22 in generally overlying relation to camera 114. It will be understood that the image generated by camera 114 at any given time is displayed on the display screen so that the frame of film positioned on template 116 will be displayed on screen 114.

Ink jet 38 is of known form and is positioned on housing front face 22a in overlying relation to the path of paper tape 16 as the film composite 18 is moved along the linear path defined by guide rails 52 and 54. Ink jet 38 is positioned in overlying relation to the upper face 56a of guide plate 56 and slightly forwardly of camera 112.

Punch 40 is positioned on the front face 22a of housing 22 slightly forwardly of ink jet 38 and in overlying relation to the path of the paper tape 16 as the composite film 18 is moved along the feed path defined by the guide rails 52 and 54. Punch 40 includes a plurality of punch members 40a and may for example be of the pneumatic type shown in U.S. Pat. No. 5,106,017 assigned to the assignee of the present application.

Take-up and drive assembly 42 includes a guide and drive reel 116 positioned on the housing front face 22a immediately forwardly of the front end 56b of guide plate 56, an idler roller 118 positioned on housing front face 22a above and rearwardly of reel 116, and a take-up reel 120 positioned on housing front face 22a generally above reel 116. Reel 116 is driven in indexing fashion by a stepper motor positioned within housing 22 and includes a plurality of circumferentially spaced teeth or serrations 116a for driving engagement with the perforations 16a of paper tape 16, and take-up reel 120 is continuously driven by a drive motor positioned within housing 22 with a slipping clutch positioned between the drive motor and the reel 120 so that the reel 120 functions to maintain tension on the film composite 18 while slipping at such time as the film composite is not being advanced so as to preclude rupturing of the film composite.

In the operation of the invention tabbing apparatus, a plurality of chips 10 and a plurality of strips 12 are arranged by the operator in a single file 14 and fed into and along the guide path 57 defined between the guide rails 52 and 54 in overlying relation to the guide plate 56. As the file of chips and strips is moved along the feed path, paper tape 16 is positioned along the inboard longitudinal edge of the film file and the paper tape is secured to the inboard edge of the film file by adhesive tape 78 positioned in underlying relation to the seam defined between the paper tape and the film files 78, by adhesive tape 89 positioned in overlying relation to the seam defined between the film file and the paper tape, or by the combination of adhesive tape 78 positioned beneath the seam and adhesive tape 89 positioned above the seam.

Figure 5:
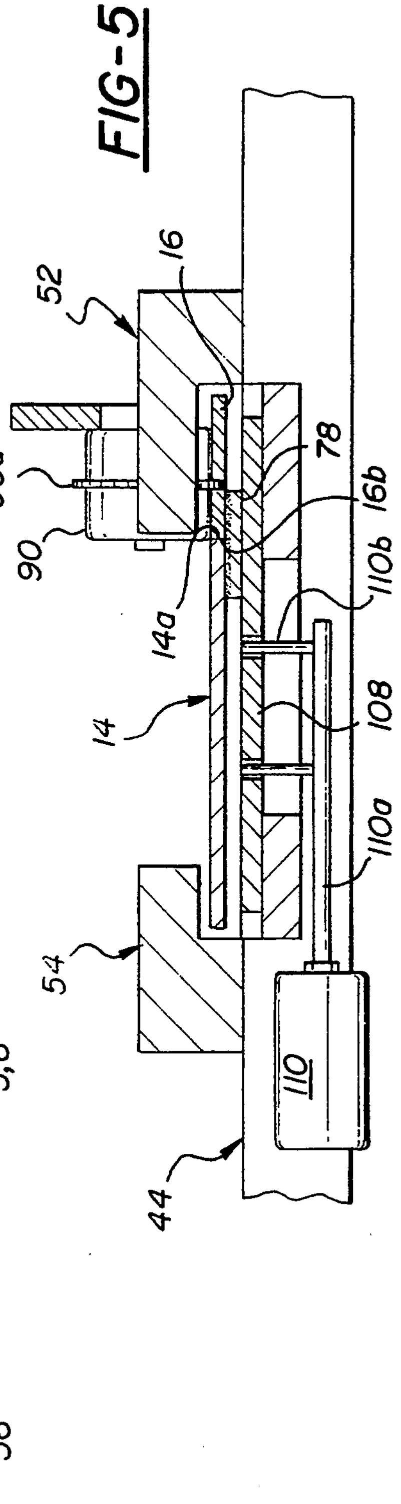
Figure 7:
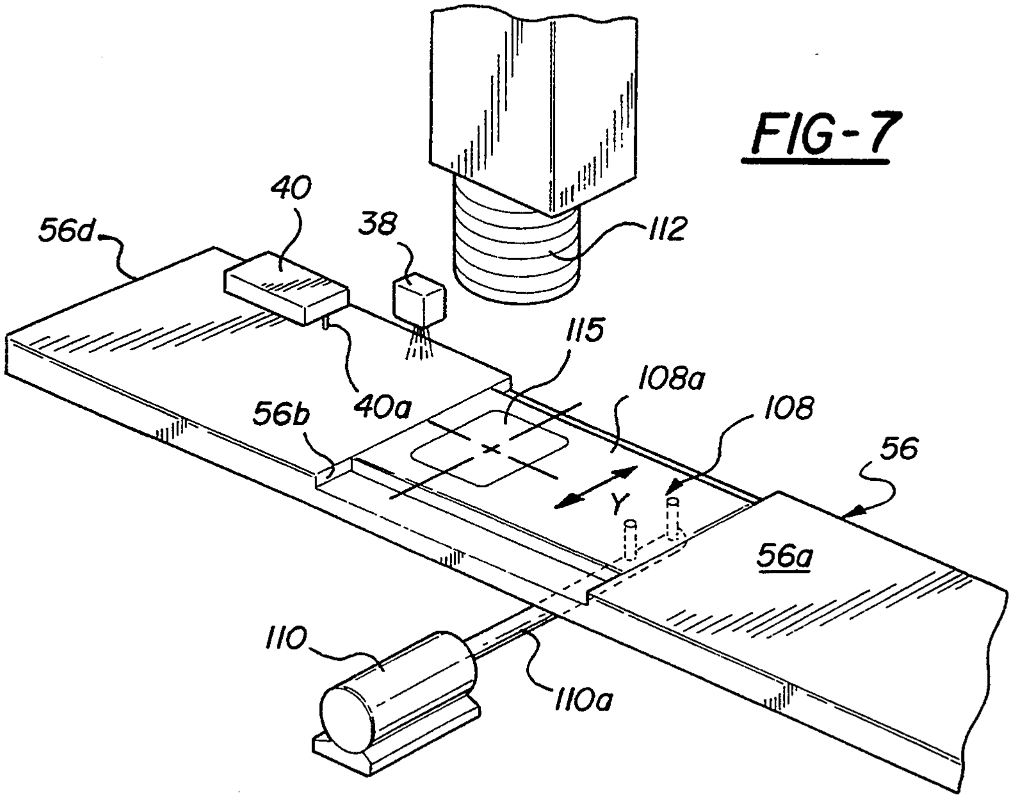
Figure 8:
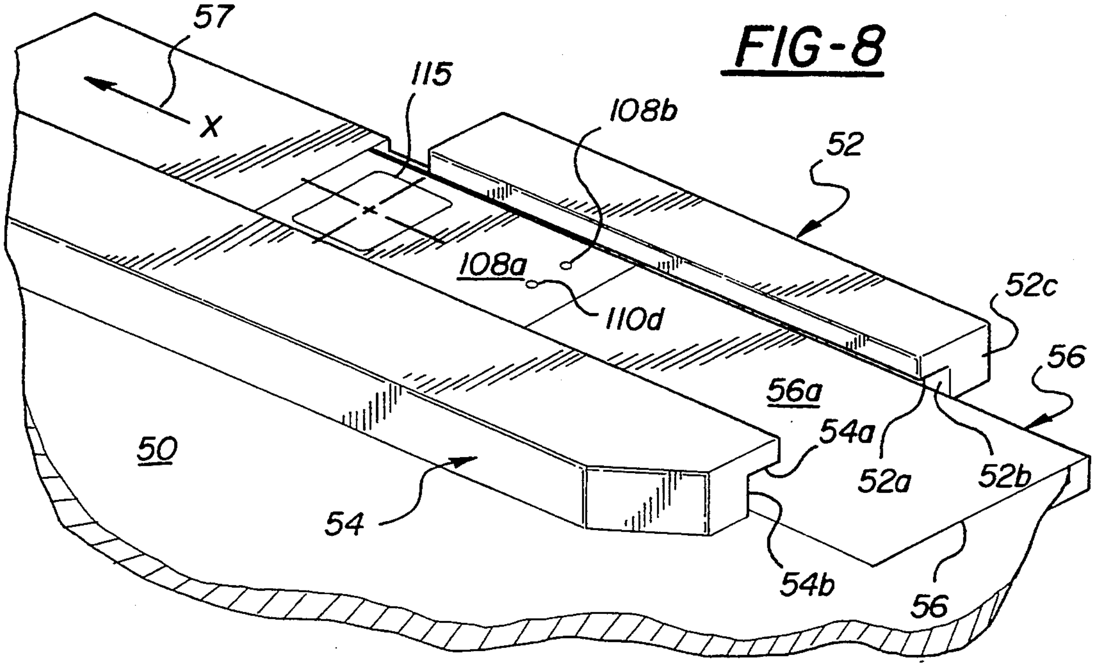

When the apparatus is operating to secure the film file to the paper tape by adhesive tape 78 positioned in underlying relation to the seam defined between the inboard edge of the film file and the paper tape, spool 82 is inactive and adhesive tape 78 is fed from spool 68 for passage around roller 70 and thereafter around roller 74 so that the tape is positioned beneath paper tape 16 being fed from paper tape roll 60 with the paper tape and adhesive tape coming together between rollers 74 and 64. As the paper tape 16 and adhesive tape 78 pass downwardly between the rollers 64 and 74, the paper tape 16 (as best seen in FIG. 5) moves into a position in which its outboard longitudinal edge 16b is positioned proximate the inboard longitudinal edge 14a of film file 14 and adhesive tape 78 assumes a position in underlying relation to film file 14 and paper tape 16 with the tape underlying and straddling the seam defined between the edges 14a and 16b.

The composite film assembly 18 thus formed moves forwardly along the feed path 57 defined between guide rails 52 and 54 until it reaches roller 90 which is downwardly biased so as to firmly seal the lower face of the inboard edge of the film file and the lower face of the inboard edge of the paper tape to the upper face of the adhesive tape with the serration 90a on the roller 90 engaging the perforations 16a in the paper tape as the film composite moves beneath and past the roller 90. After moving past the roller 90 the composite film passes beneath ink jet 38 and punch 40 for passage around drive reel 116 whereafter the film moves upwardly around idler roller 118 for winding take-up on take-up reel 120. Whereas the initial feed of the film composite 18, the paper tape 16, and the adhesive tape 78 is hand controlled, as soon as the composite reaches the drive reel 116 the movement of the composite through the apparatus is thereafter powered and controlled by drive reel 116. As previously indicated, drive reel 116 is driven by the stepper motor and the stepper motor in turn is controlled either by an appropriate foot pedal (not shown) or by a control button of a control console 124 positioned, for example, on apron 50. Once the film composite, adhesive tape and paper tape have been threaded to reach drive reel 116, the forward movement of the film and tape is controlled by drive reel 116 with take-up reel 120 functioning via the clutched drive motor continuously driving the take-up reel to maintain tension in the system.

Figure 6:
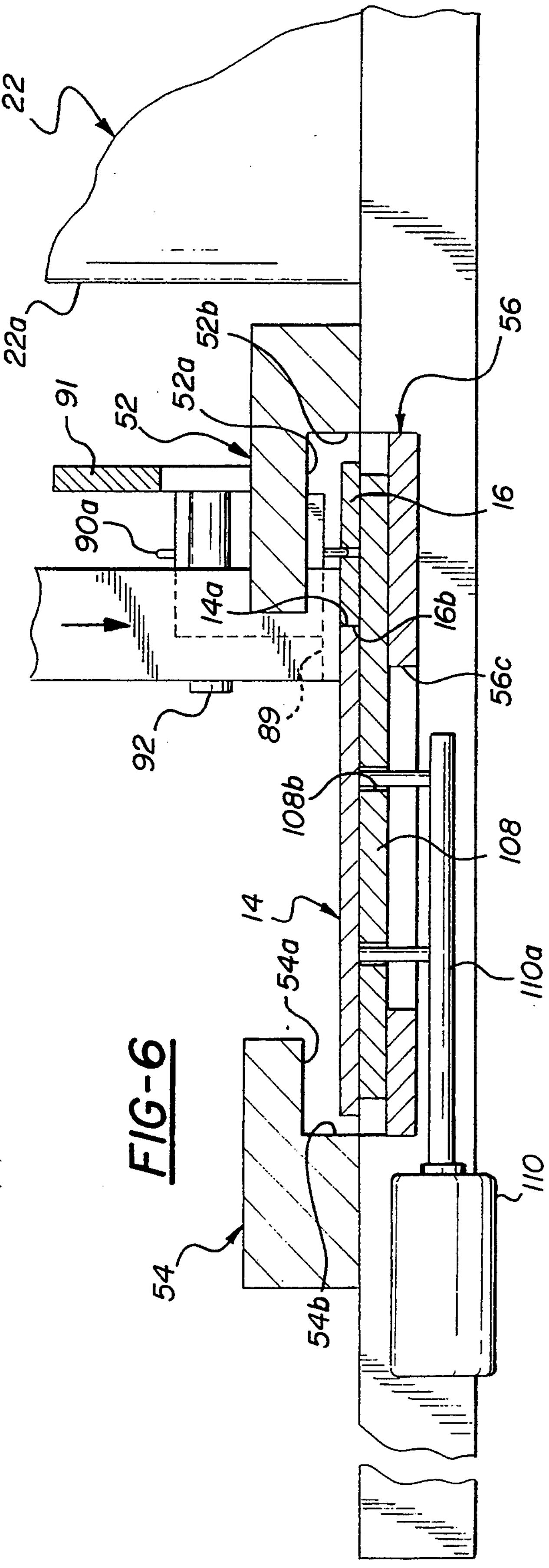
FIGS. 5 and 6 are cross sectional views taken on lines 5—5 and 6—6 of FIG. 4.

When it is desired to apply adhesive tape in overlying relation to the seam between the film file and the paper tape, spool 68 is immobilized and adhesive tape 89 is fed from spool 82, around guide rod 88, around guide rod 92, and beneath roller 90 where it moves into a position (as best seen in FIG. 6) wherein the adhesive tape overlies the seam defined between the inboard edge 14a of the film file and the outboard edge 16b of the paper tape 16. It will be seen that in this situation roller 90 functions not only to guide tape 89 into overlying position with respect to the seam between the film file and the paper tape but also applies a downward sealing pressure on the assembly so as to ensure that the adhesive tape is firmly secured to the film file and to the paper tape. As in the underlying tape arrangement, the film and tape composite thereafter moves past ink jet 30 and past punch 40 for driving engagement by drive reel 116 and for take-up by take-up reel 120.

When it is desired to apply adhesive tape both above and below the seam between the film file and the paper tape, both spool 82 and spool 68 are operative and adhesive tape 78 is applied in underlying relation to the seam between the film file and the paper tape while adhesive tape 89 is simultaneously applied in overlying relation to the seam with the film and tape composite thereafter again moving forwardly past ink jet 38 and past punch 40 for driving engagement with drive reel 116 and for take-up on take-up reel 120.

In situations where the film being processed is in roll form, rather than in the form of chips and strips, the roll of film 102 is positioned on rod *62b*, lever 98 is moved pivotally to its downward or solid line position of FIG. 4, and the film 104 is threaded around guide rod 96 for passage beneath rail 52 whereafter the inboard edge of the film may be secured to paper tape 16 either by underlying adhesive tape 78, by overlying adhesive tape 89, or by a combination of underlying adhesive tapes 78 and overlying adhesive tape 89 with the film tape composite again thereafter moving past the ink jet 38 and the punch 40 for driving engagement with driver reel 116 and take-up on take-up reel 120.

In all of the arrangements thus far described, as each frame of film 126 is steppingly moved into a position in generally overlying relation to template 116, a cropping operation is performed on the film frame to ensure that the desired portion of the image of the film frame, as measured in X and Y directions, is positioned on the template 115. This cropping operation is performed in an X direction by selected indexing movement of the film by the stepper motor driving the drive reel 116, as controlled by console 124, and the Y positioning of the film frame relative to the template 115 is controlled by stepper motor 110 which acts through pins *110b* to move cropping plate 108 back and forth in a lateral or Y direction to position the template 115 in the desired cropping position relative to the image on the frame. The cropping operation is assisted by the camera 112 acting in coaction with the screen 114 to display the image on the film frame on the screen and thereby assist the operator in providing an accurate X and Y positioning of the film frame relative to the template 115. Once the film frame has been satisfactorily positioned in an X and Y sense relative to the template 115, the X and Y information is entered in data storage 48 by the operator, utilizing console 124.

Each frame is also provided with an individual machine readable indicium by the punch 40 and with an individual human readable indicium by the ink jet 38. The machine readable indicia provided by the punch 40 may comprise punch hole codes comprising for example a single punch hole for the first frame in a series, two punch holes for the second frame in a series, three punch holes for the third frame in a series, etc., and the human readable indicia provided by the ink spray 38 may comprise arabic numerals 1, 2, 3, etc., positioned on the paper tape 16 proximate the corresponding machine readable or punched code on the tape for that particular frame. Both the machine readable and human readable indicia are preferably provided on the punch tape at a location outboard of the perforation *16a*. The machine readable and human readable indicium provided on the film composite for each frame may appear directly opposite the corresponding frame but, more typically, will be linearly displayed in the X direction from the corresponding frame by a distance that will be determined by the particular piece of photographic processing equipment to which the film is to be delivered after editing by the invention tabbing apparatus.

For example, if the film leaving the invention tabbing apparatus is thereafter delivered to an automatic film printer 128 the distance between the machine readable and human readable indicia and the corresponding frame as measured in the X direction will correspond to the spacing in the printer between the sensor of the printer and the optical stage of the printer so that, as the machine readable and human readable indicium on the paper tape arrive at the sensor of the printer and the information stored in the data base is accessed by the sensor by virtue of identifying the machine readable indicia, the frame of the film corresponding to the machine readable indicium being read by the sensor will be positioned on the optical stage of the printer so that the information retrieved from the data base by virtue of the sensor reading the instantaneous machine readable code positioned at the sensor will correspond to the frame instantaneously positioned at the optical phase of the printer.

In addition to punching a machine readable indicium on the tabbing for each frame of the film file and simultaneously entering cropping information for each frame in the data base, the operator may also optionally enter information about the film format, the print formats, the print packages, the job number, or the twin check number. Each frame of the film file is thus individually identified in the data base and associated with the corresponding information relating to cropping, film format, print format, job number, etc. so that when each individual frame of film reaches the subsequently processing equipment, such as the printer, the individual machine readable indicium provided on the tabbing paper tape for each frame may be read by the sensor or other reading device and the information stored in the data base with respect to that frame may thereby be called up from the data base for use in appropriately controlling the printer to provide prints corresponding to the instantaneous film frame having the proper cropping format, etc.

Whereas the invention tabbing apparatus has been illustrated as delivering the processed film directly to a printer, it will be understood that in many film processing laboratories the film leaving the tabbing apparatus will be delivered to a film analyzer where density and color analysis (red, blue, green) adjustments will be made with respect to each frame for entry into the data base information corresponding to that frame whereafter the film may be delivered to the printer. Optionally, the camera 112 and the screen 114 of the invention tabbing apparatus may be utilized, in conjunction with the control console 124, to perform density and color analysis with respect to each frame so that the film leaving the tabbing apparatus includes cropping, density, and color analysis information with respect to each frame, thereby allowing the film to be delivered directly to a printer and eliminating the need for an intermediate analyzer stage.

The invention film tabbing apparatus will be seen to provide many important advantages as compared to prior art devices and methodology. For example, the provision of a discrete machine readable code for each frame on the paper tabbing tape of the film file allows each frame to be accurately correlated to a body of information stored in the data base so that the out of sequence problems inherent in the prior art apparatus and methodology is totally eliminated since the apparatus is not sequence dependent but rather specifically identifies each frame and specifically accesses the particular information relevant to that frame. Further the provision for each frame of a human readable indicium on the tabbing tape of the film file, in addition to the machine readable code, allows the operator to visually correlate and verify frame identifiers with individual frames irrespective of the identification provided by the machine readable code. Further, since each frame is provided with a discrete code, manipulation of the photographic exposure, printing and packaging can be done in a random non-sequential fashion.

Whereas a preferred embodiment to the invention has been illustrated and described in detail, it will be apparent that various changes may be made in the disclosed embodiment without departing from the scope or spirit of the invention.

I claim:

1. A method of processing a supply of photographic film including single frame chips and multiple frame strips comprising the steps of:

providing a data storage device and an operator control console controlling the entry of data into the data storage device;

moving the chips and strips along a linear feed path in a single file;

moving a tabbing tape along the linear feed path with a longitudinal edge of the tape positioned proximate an adjacent longitudinal edge of the film file;

securing the proximate longitudinal edges of the tape and the film file together;

providing a coded indicium on the tape corresponding to each frame of the film file;

providing a cropping station along said feed path including a cropping plate mounted for movement laterally of the feed path, a display screen, and a camera operative to display an image of a frame positioned on the cropping plate on the display screen;

cropping each film frame at the cropping station by selectively moving the cropping plate laterally while viewing the image of the film frame positioned on the cropping plate on the display screen; and utilizing the operator control console to enter the cropping information generated at the cropping station in the data storage device for use in a subsequent film processing operation.

2. A method according to claim 1 wherein the method includes the further step of:

providing a human readable indicium on the tape corresponding to each frame of the film file.

3. A method according to claim 1, wherein:

the coded indicium is provided on the tape by punching holes in the tape.

4. A method according to claim 2 wherein:

the human readable indicium is provided on the tape by spraying ink on the tape.

5. A tabbing apparatus comprising:

a data storage device;

means defining a feed surface;

guide means defining a feed path along the feed surface for receipt of a single file of single frame chips and multiple frame strips;

means operative to deliver a tabbing tape to the feed path and secure the tape to one longitudinal edge of the film file;

means operative to provide a coded indicium on the tape corresponding to each frame of the film file;

a cropping station positioned along said feed path and including a cropping plate mounted for movement in a direction lateral to said path, motor means for moving the cropping plate laterally of the path, a display screen, and a camera positioned over the cropping plate and operative to display an image of a frame positioned on the cropping plate on the display screen; and an operator control console operative to enter the cropping information generated at the cropping station in the data storage device for use in a subsequent film processing operation.

6. An apparatus according to claim 5 wherein:

the apparatus further includes means operative to provide a human readable indicium on the tape corresponding to each frame of the film file.

7. An apparatus according to claim 5 wherein:

the coded indicium providing means comprises a punch operative to punch a coded indicium in the tape corresponding to each frame of the film file.

8. An apparatus according to claim 6 wherein:

the human readable indicium providing means comprises an ink jet operative to spray a human readable indicium on the tape corresponding to each frame of the film file.

9. A tabbing apparatus comprising:

means defining a feed surface;

a data storage device;

guide means defining a feed path along the feed surface for receipt of a single file of single frame chips and multiple frame strips;

means operative to deliver a tabbing tape to the feed path and secure the tape to one longitudinal edge of the film file;

means operative to provide a coded machine readable indicium on the tape corresponding to each frame of the film file;

means operative to provide a human readable indicium on the tape corresponding to each frame of the film file;

a cropping station positioned along said feed path and including a cropping plate mounted for movement laterally of the feed path, a display screen, a camera operative to display an image of a film frame positioned on the cropping plate on the display screen, and motor means for selectively moving the cropping plate laterally of the feed path; and an operator control console operative to enter the cropping information generated at the cropping station in the data storage device for use in a subsequent film processing operation.

10. An apparatus according to claim 9 wherein:

the machine readable indicium providing means comprises a punch positioned along the feed path and operative to punch a coded indicium in the tape corresponding to each frame of the film file;

the human readable indicium providing means comprises an ink jet positioned along the feed path and operative to spray a human readable indicium on the tape corresponding to each frame of the film path;

a seam is formed between the tape and the longitudinal edge of the film file; and the means operative to secure the tape to the film file comprises means for delivering a supply of adhesive tape to the feed path in overlapping relation to the seam.

11. An apparatus according to claim 10 wherein:

the means for delivering includes means for delivering the adhesive tape to the feed path in overlying relation to the seam and further means for delivering the adhesive tape to the feed path in underlying relation to the seam.

* * * * *